Nov. 19, 1963  L. LOMANDO  3,111,330
TRICYCLE WITH ANIMAL MOTION SIMULATING SEAT
Filed Jan. 15, 1963  2 Sheets-Sheet 1
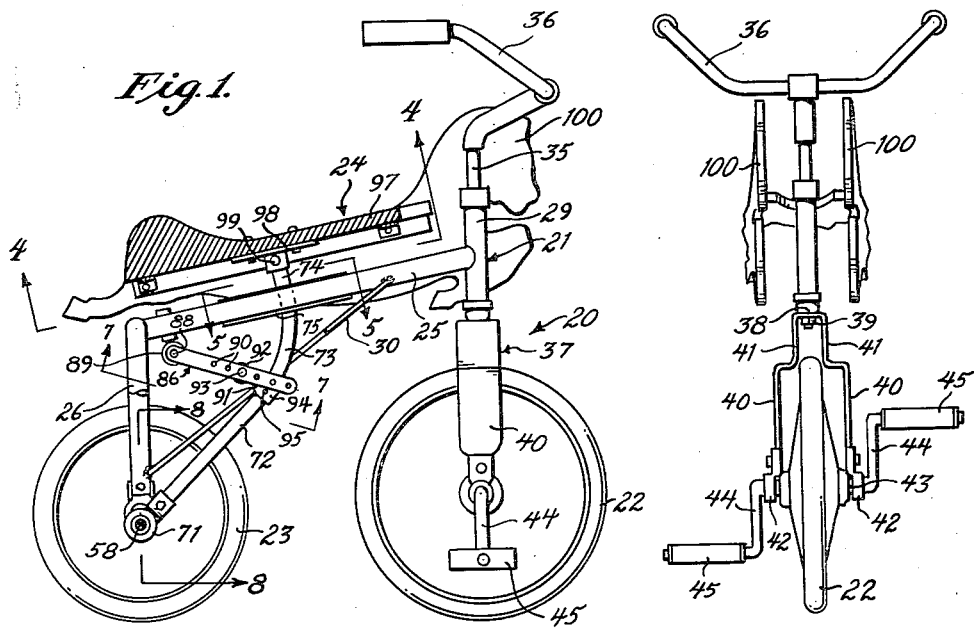
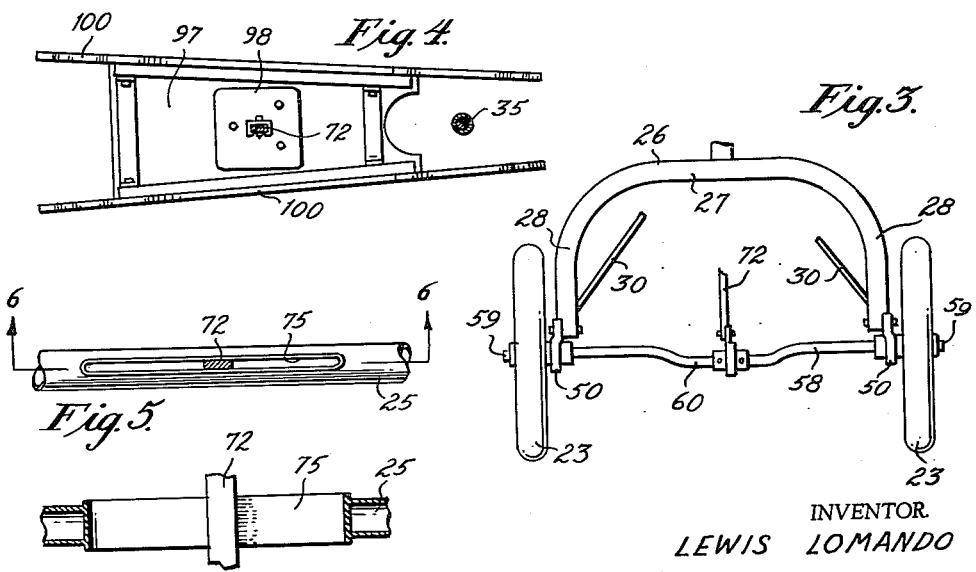
INVENTOR.
LEWIS LOMANDO
BY Robert K. Youtie
ATTORNEY.

Nov. 19, 1963     L. LOMANDO     3,111,330
TRICYCLE WITH ANIMAL MOTION SIMULATING SEAT
Filed Jan. 15, 1963     2 Sheets-Sheet 2
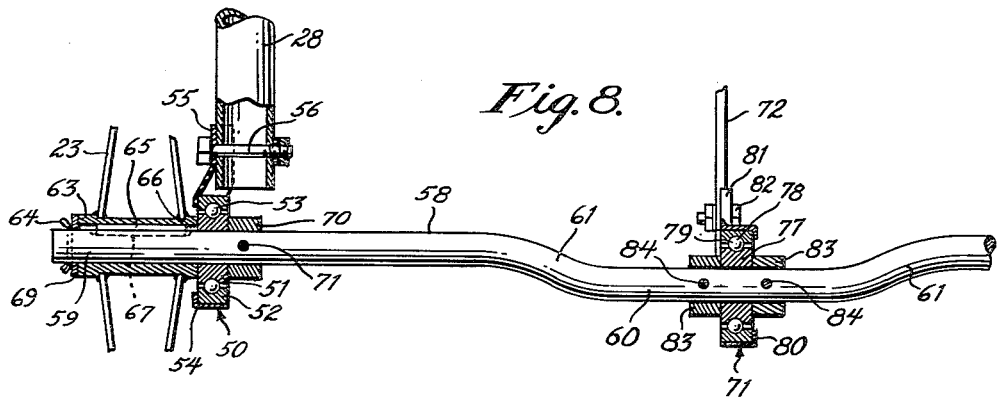
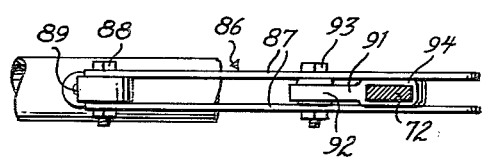
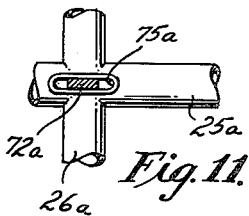
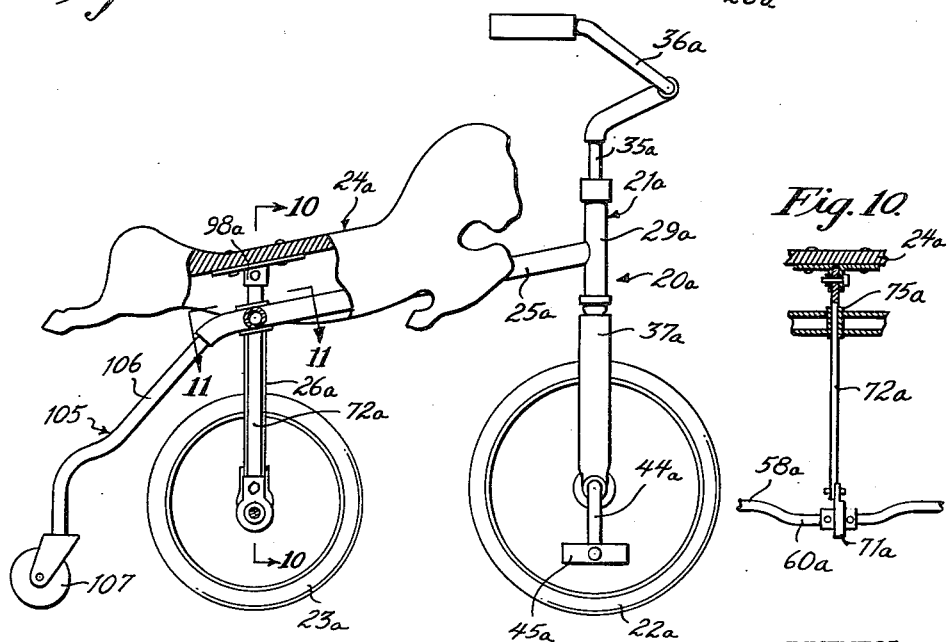
INVENTOR.
LEWIS LOMANDO
BY Robert K. Youtie
ATTORNEY.

United States Patent Office 3,111,330
Patented Nov. 19, 1963

3,111,330
TRICYCLE WITH ANIMAL MOTION
SIMULATING SEAT
Lewis Lomando, 608 Monges St., Hazleton, Pa.
Filed Jan. 15, 1963, Ser. No. 251,678
5 Claims. (Cl. 280—1.192)

This invention relates generally to toys or playthings, and is especially concerned with wheeled vehicles for children.

While there have in the past been proposed numerous constructions of children's vehicles adapted to simulate the riding of an animal or otherwise, these previous devices have not found wide acceptance for many reasons. For example, prior devices of this type did not accurately simulate animal movements, and were relatively complex in design so as to be expensive to manufacture and unreliable in use.

Accordingly, it is an important object of the present invention to provide a wheeled vehicle for children of the type described which overcomes the above-mentioned difficulties, more accurately simulating true animal movements in operation, being extremely simple in construction to minimize production costs, and being entirely reliable and durable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a side elevational view, partly in section, showing a tricycle constructed in accordance with the teachings of the present invention;

FIGURE 2 is a front elevational view of the tricycle of FIGURE 1, broken away toward the rear;

FIGURE 3 is a rear elevational view of the tricycle of FIGURE 1, broken away toward the front;

FIGURE 4 is a sectional view taken substantially along the line 4—4 of FIGURE 1;

FIGURE 5 is a sectional view taken substantially along the line 5—5 of FIGURE 1;

FIGURE 6 is a sectional view taken substantially along the line 6—6 of FIGURE 5;

FIGURE 7 is a sectional view taken substantially along the line 7—7 of FIGURE 1;

FIGURE 8 is a sectional view taken generally along the line 8—8 of FIGURE 1;

FIGURE 9 is a side elevational view showing a slightly modified embodiment of tricycle of the present invention, partly broken away;

FIGURE 10 is an elevational view taken substantially along the line 10—10 of FIGURE 9; and FIGURE 11 is a sectional view taken generally along the line 11—11 of FIGURE 1.

Referring now more particularly to the drawings, and specifically to FIGURES 1-8 thereof, a tricycle is shown in FIGURE 1 and there generally designated 20. The tricycle includes a generally forwardly and rearwardly, upstanding frame 21 mounted for travel on forward and rearward ground-engageable wheels 22 and 23. A rider support or seat is located over the frame 21 and generally designated 24.

The frame 21 may include a generally forwardly and rearwardly extending tube or bar 25, having depending from the rear region thereof an inverted, generally U-shaped laterally extending frame member 26 in the nature of a yoke having an upper crosspiece 27 and laterally spaced legs 28 depending from opposite ends of the crosspiece (see FIGURE 3). A column 29 is carried at the forward end of bar 25, the column being generally upright and fixed at a medial region to the forward end of the bar.

If desired, diagonal braces 30 may extend from the legs 28 to the bar 25 to reinforce the frame 21.

Extending through and rotatably journaled in the forward column 29 is a steering shaft 35, which has fixed on its upper end a steering or handle bar 36. Extending downward beneath the lower end of column 29 is a fork 37 having an upper cross region 38 (see FIGURE 2) fixed to the lower end of steering shaft 35, as by fastener 39, and a pair of depending legs 40. It will be observed that the upper regions 41 of the legs 40 are offset laterally inward, for a purpose appearing presently. The lower ends of legs 40 carry bearings 42, which may be of any suitable type, and which serve to journal opposite ends of a front wheel axle 43. Extending from opposite ends of the axle 43 are crank arms 44, each carrying a pedal 45 for effecting rotation of front wheel 22 by the feet of a user.

The rear frame member 26 has secured at the lower end of each leg 28 a bearing 50, which may be of any suitable type. In the illustrated embodiment, see FIGURE 8, a bearing 50 is shown as of antifriction, ball construction, including inner and outer annular races 51 and 52, interposed rollable balls 53, and a housing 54 about the outer race having an upward extension 55 secured by suitable means, such as fastener 56 to the lower end of frame-member leg 28. The bearings 50 may be identical, so that a detailed description of one will suffice.

A generally horizontal rear axle or shaft 58 extends laterally of the frame 21 between the rear frame-member legs 28 and has its opposite end portions 59 projecting outward through respective bearings 50 so as to be rotatably supported or journaled by the bearings. The axle or shaft 58 is advantageously configured with its medial region 60 offset from an extending generally parallel to the remainder of the axle, as by smoothly curved or bent portions 61 extending between opposite ends of the offset portion 60 and respective adjacent portions of the axle. The axle 58 may thereby act as a crank or crankshaft, the offset portion 60 being spaced from the axis of rotation through the bearings 50.

The rear wheels 23 may each include a hub 63 engaged over a respective projecting end portion 59 of the axle 58, and retained thereon by suitable fastener means, such as a cotter pin 64. At least one of the wheels 23 is nonrotatably fixed to its supporting axle portion 59 (see FIGURE 8), as by a key 65 received in appropriate recesses 66 and 67 of the hub and axle. While a key is shown as nonrotatably securing one wheel 23 to the axle 58, other appropriate means may be employed.

In order to retain the wheels 23 and axle 58 properly assembled with the rear frame member 26, an outer abutment member or washer 69 may be interposed between the outer end of each hub 63 and the adjacent fastener or cotter pin 64, while a stop collar 70 may be located inward of and adjacent to each bearing 50, being engaged about the axle 58 and detachably secured thereto by suitable means, such as a setscrew or cross pin 71.

A connecting rod or bar 72 has its lower end pivotally connected to the medial axis offset 60, as by a bearing 71, and extends forward and upward therefrom. That is, the connecting rod or bar 72 inclines forward from the axle 58 and is formed with a medial portion 73 extending arcuately upward and terminating in a generally straight upper end portion 74 above the frame 21. More specifically, the connecting rod or bar 72 may be located along the longitudinal centerline of the frame 21, as is the frame bar 25, and the bar may be provided with an elongate, vertically opening through slot or guideway 75 through which the connecting rod passes. In the instant embodiment, the guideway or slot 75, opening vertically upward and downward through the bar 25, affords lateral support or constraint to the connecting rod 72 and is relatively long to permit of movement by the connecting rod both vertically through and longitudinally along the slot.

As best seen in FIGURE 8, the lower end of connecting rod 72 may be connected to the bearing 71, to rotatably connect the axle offset 60 to the connecting rod. The bearing 71 may be of any suitable type, and is shown for purposes of illustration as being of the antifriction variety, including inner and outer annular races 77 and 78 having rollable balls 79 interposed therebetween and provided with an outer casing 80 having an extension 81 fixedly secured by suitable fastener means 82 to the lower end of connecting rod 72. Proper location of the bearing 71 may be obtained by suitable stop means, such as a pair of collars 83 circumposed about the shaft portion 60 on opposite sides of the bearing 71 and detachably secured thereto, as by crosspins or setscrews 84. For economy in manufacture and maintenance, the internal diameters of the stop collars 83 and the inner bearing race 77 are advantageously such as to permit of sliding engagement and removal thereof along the axle 58 including the curved or bent portion 61. Viewed otherwise, the radii of bends provided in portions 61 are advantageously sufficiently large to permit of sliding movement therealong by the collars 83 and bearing 71 to facilitate assembly, replacement and repair.

In addition to the lateral constraint imposed on the connecting rod 72 by the guideway or slot 75, constraint in a vertical plane may be imposed on the connecting rod by a linkage 86. The linkage 86 has spaced locations respectively pivoted to the frame 21 and the connecting rod 72, so that the connecting rod is fully constrained to a predetermined pattern of motion upon rotation of the axle 58 to rotate the offset portion 60 and lower end of the connecting rod. More particularly, the linkage 86 includes a pair of parallel links or straps 87 (see FIGURE 7) having one pair of adjacent ends pivotally connected, as by a pin 88 to a rearward region of bar 25, the bar being provided with a fixed, depending stud or lug 89 and the pin 88 being received through both the rearward ends of links 87 and the lower end of the stud located between the links. Each of the links 87 is advantageously provided with a plurality of longitudinally spaced through holes 90, with the holes of the respective links in substantial alignment with each other. A connecting member 91 has one end 92 located between the links 87, spaced from the lug 89, and receives a pin or fastener 93 extending through both the connecting member and aligned apertures 90 of the pair of links. The other end 94 of the connecting member 91 may assume the configuration of a loop or eye for receiving an intermediate portion of the connecting rod 72. Suitable means may be provided for adjustably securing the connecting rod 72 in position received within the loop or eye 94, such as a setscrew or crosspin 95. It will now be appreciated that the links 87 are pivotally connected between the frame 21 and an intermediate portion of connecting rod 72, the connecting pivots being horizontal, so as to fully constrain connecting-rod movement in a vertical plane.

The passenger support 24 is preferably a body simulating the appearance of an animal, such as a horse, and may be formed by any well-known procedure. As illustrated, the support body includes a generally horizontal seat 97, having fixed on its underside a downwardly facing socket 98 for reception and fast securement to the upper end of connecting rod 72, as by a fastener 99.

Secured along opposite sides of the seat 97, the simulation or body of support 24 may include a pair of generally vertically disposed sidepieces 100. For comfort, enabling a child to more easily straddle the support 24 and reach the pedals 45, the sidepieces 100 may converge in the forward direction. As best seen in FIGURE 4, the seat 97 may terminate short of the steering shaft 35, while the the sidepieces 100 may extend forward beyond the steering shaft. However, the sidepieces 100 do not interfere or obstruct operation of the steering mechanism, preferably being beneath the handle bar 36, and as the upper portions 41 of fork legs 40 are inset to avoid contact with the sidepieces.

It will now be understood that the instant construction provides a simple, durable and reliable tricycle structure wherein true animal movements are accurately simulated by motion of the support 24 upon rotation of the wheels 23 through operation of the connecting rod 72.

For children of different sizes, and to vary the simulated animal motion, the pin 93 of linkage 86 may be selectively inserted through the several pairs of aligned holes 90. This will place the support 20 closer to or farther from the pedals 45, as permitted by the length of slot or guide 75.

A slightly modified embodiment of tricycle is shown in FIGURES 9–11, a tricycle there generally being designated 20a and including a frame 21a and forward and rearward wheels 22a and 23a.

The frame may have a longitudinally extending bar 25a, a rearwardly depending, laterally extending frame member or yoke in the configuration of an inverted U, as at 26a, and a forward upstanding steering column or tube 29a.

A steering column or shaft 35a extends through the tube 29a, having a handle bar 36a on its upper end, and provided on its lower end with a fork 37a in which is rotatably mounted the front wheel 22a. Suitable crank arms 44a and pedals 45a are associated with the wheel 22a and fork 37a.

The rear wheels 23a are rotatably carried by opposite ends of an axle or shaft 58a extending laterally between and rotatably supported by the rear frame member 26a. The axle 58a may have a medial offset 60a for operation in the manner of a crank or eccentric, as in the first-described embodiment.

A connecting rod or bar 72a has its lower end pivotally connected, as by bearing 71a to the medial offset 60a of axle 58a, and extends generally upward therefrom through a slot or guide 75a in the frame member 25a.

As best seen in FIGURE 11, the slot or constraining guide 75a is of relatively short longitudinal extent, so as to permit of only limited forward and rearward motion of the received connecting rod 72a. Thus, upon rotation of the crankshaft or axle 58a with the wheels 23a, the guide or slot 75a effectively constrains both lateral and forward and rearward movement of the received portion of connecting rod 72a.

A support for a user is located above the frame 21a and generally designated 24a, which support may be substantially the same as that disclosed in the first embodiment, or assume other desired configurations. A socket 98a fixedly depends from the underside of the support 24a for fixed reception of the upper end of connecting rod 72a. In this manner, the support 24a is effectively mounted and constrained by the guide 75a to a pattern of motion accurately simulating that of an animal's body movement.

While the slot or guide 75a is illustrated as being substantially directly above the axle 58a, which may be preferred to minimize sliding friction of the connecting rod 72a in the guide, it is appreciated that the guide may be otherwise located, if desired. The illustrated embodiment also shows the use of a stabilizer 105, which may be desirable for use with extremely small children to prevent tipping. The stabilizer 105 may include an elongate member or tube 106 extending rearwardly and downwardly from the rear end of bar 25a and provided on its lower end with a ground-engageable caster or swivel wheel 107.

From the foregoing, it is seen that the present invention provides a wheeled vehicle for children which fully accomplishes its intended objects and is well adapted to meet practical conditions of manufacture, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A tricycle comprising an upstanding frame, a pair of ground-engageable rear wheels rotatably carried by said frame, a ground-engageable front wheel rotatably carried by said frame, a rear shaft extending laterally between said rear wheels and keyed to at least one of said rear wheels for rotation therewith, a medial offset on said shaft, a connecting rod having one end rotatably connected to said offset extending generally upward therefrom to an upper end above said frame, constraining means operatively connected between said frame and an intermediate region of said connecting rod to constrain the upper connecting rod end to a predetermined motion upon rotation of said shaft, and a passenger support carried on the upper end of said connecting rod above said frame, said support comprising a simulated body and being rigidly secured to said connecting rod.

2. A tricycle according to claim 1, said front wheel being dirigible, and said simulated body depending spacedly on opposite sides of said frame for unobstructed dirigibility of said front wheel.

3. A tricycle comprising an upstanding frame, a pair of ground-engageable rear wheels rotatably carried by said frame, a ground-engageable front wheel rotatably carried by said frame, a rear shaft extending laterally between said rear wheels and keyed to at least one of said rear wheels for rotation therewith, a medial offset on said shaft, a connecting rod having one end rotatably connected to said offset extending generally upward therefrom to an upper end above said frame, constraining means operatively connected between said frame and an intermediate region of said connecting rod to constrain the upper connecting rod end to a predetermined motion upon rotation of said shaft, and a passenger support carried on the upper end of said connecting rod above said frame, said constraining means comprising a link having spaced locations respectively pivotally connected to said frame and an intermediate region of said connecting rod.

4. A tricycle comprising an upstanding frame, a pair of ground-engageable rear wheels rotatably carried by said frame, a ground-engageable front wheel rotatably carried by said frame, a rear shaft extending laterally between said rear wheels and keyed to at least one of said rear wheels for rotation therewith, a medial offset on said shaft, a connecting rod having one end rotatably connected to said offset extending generally upward therefrom to an upper end above said frame, constraining means operatively connected between said frame and an intermediate region of said connecting rod to constrain the upper connecting rod end to a predetermined motion upon rotation of said shaft, and a passenger support rigidly carried on the upper end of said connecting rod above said frame.

5. A tricycle according to claim 4, said constraining means comprising a guide fixed to said frame and slidably receiving said connecting rod.

References Cited in the file of this patent

UNITED STATES PATENTS

| | | |
|---|---|---|
| 1,592,036 | Merriman | July 13, 1926 |
| 1,611,915 | Johnson | Dec. 28, 1926 |
| 2,400,265 | Sieger | May 14, 1946 |
| 2,837,342 | Kirk | June 3, 1958 |
| 2,883,202 | Morgan | Apr. 21, 1959 |